United States Patent [19]

Abadi

[11] 4,435,303
[45] Mar. 6, 1984

[54] DESCALING COMPOSITION

[76] Inventor: Khodabandeh Abadi, 5719 N. Camino Del Conde, Tucson, Ariz. 85718

[21] Appl. No.: 455,298

[22] Filed: Jan. 3, 1983

[51] Int. Cl.³ .......................... C02F 5/08; C02F 5/10; C23F 11/00

[52] U.S. Cl. ...................................... 252/80; 252/81; 252/82; 252/86; 252/87; 252/142; 252/178; 252/181

[58] Field of Search .................... 252/82, 81, 86, 87, 252/142, 181, 178

[56] References Cited

U.S. PATENT DOCUMENTS

| | | | |
|---|---|---|---|
| 2,261,700 | 11/1941 | Ryznar | 252/87 |
| 2,589,195 | 3/1952 | Monson | 252/82 X |
| 2,847,384 | 8/1958 | Conkin et al. | 252/82 X |
| 3,000,830 | 9/1961 | Richmond et al. | 252/542 X |
| 3,041,285 | 6/1962 | Newman | 252/142 X |
| 3,053,897 | 9/1962 | Clark | 252/82 X |
| 3,075,924 | 1/1963 | Rubin | 252/82 X |
| 3,699,047 | 10/1972 | Petrey | 252/81 X |
| 4,149,969 | 4/1979 | Robitaille et al. | 252/181 X |
| 4,276,185 | 6/1981 | Martin | 252/82 X |

Primary Examiner—John E. Kittle
Assistant Examiner—Mukund J. Shah
Attorney, Agent, or Firm—Martin Sachs

[57] ABSTRACT

The present invention is directed to a composition which includes an anionic fatty alcohol metal sulfate surfactant, a nonionic substituted poly (ethylene oxide) surfactant, an ethanolamine, zinc and hydroxyacetic acid. A method for removing scale from a surface is taught.

33 Claims, 2 Drawing Figures

CONTACT TIME (HOURS)

| CONCENTRATION (%) | 0 | 10 | 15 | 20 | 25 | 50 | 100 |
|---|---|---|---|---|---|---|---|
| TIME ELAPSED (hrs.) | SCALE CHIP WEIGHT (grams) | | | | | | |
| 0 | 3.5 | 7.8 | 7.5 | 7.6 | 8.3 | 5.2 | 5.2 |
| 1 | 3.5 | 7.5 | 7.0 | 7.2 | 8.2 | – | – |
| 2 | 3.5 | 7.1 | 6.7 | 7.0 | 7.9 | – | – |
| 3 | 3.4 | 6.9 | 6.6 | 6.9 | 7.8 | 4.9 | 5.0 |
| 4 | 3.4 | 6.9 | 6.6 | 6.7 | 7.6 | 4.7 | 4.6 |
| 6 | 3.4 | 6.3 | 6.5 | 6.7 | 7.3 | 4.7 | 4.6 |
| 9 | 3.4 | 6.3 | 6.4 | 6.8 | 7.3 | 4.6 | 4.6 |

FIG. I

| CONCENTRATION (%) | 0 | 10 | 15 | 20 | 25 | 50 | 100 |
|---|---|---|---|---|---|---|---|
| TIME ELAPSED (hrs.) | SCALE CHIP WEIGHT (grams) | | | | | | |
| 0 | 3.5 | 7.8 | 7.5 | 7.6 | 8.3 | 5.2 | 5.2 |
| 1 | 3.5 | 7.5 | 7.0 | 7.2 | 8.2 | – | – |
| 2 | 3.5 | 7.1 | 6.7 | 7.0 | 7.9 | – | – |
| 3 | 3.4 | 6.9 | 6.6 | 6.9 | 7.8 | 4.9 | 5.0 |
| 4 | 3.4 | 6.9 | 6.6 | 6.7 | 7.6 | 4.7 | 4.6 |
| 6 | 3.4 | 6.3 | 6.5 | 6.7 | 7.3 | 4.7 | 4.6 |
| 9 | 3.4 | 6.3 | 6.4 | 6.8 | 7.3 | 4.6 | 4.6 |

DESCALING COMPOSITION

BACKGROUND OF THE INVENTION

The present invention is directed to a composition which may be employed to remove scale. More particularly, the composition includes an anionic surfactant, a nonionic surfactant, an ethanolamine, zinc and hydroxyacetic acid.

Scale is a general term to describe precipitates from aqueous fluids which deposit on surfaces, general (a) a result of water evaporation. Scale mterials include compounds such as sulfates, oxides, carbonates, halides and the like of metals such as iron, calcium, magnesium and potasssium. Examples include calcium carbonate and iron oxides. Scale can also result from deposition of organic material such as grease and oil present in the aqueous medium.

To be effective, a descaling composition should break down all of the components of scale. Primarily, the descaling composition should remove carbonates and sulfates from the surface to be cleaned. In certain instances the ability to remove grease and oil is an important property.

A number of methods have been devised to prevent or remove scale. For example, Rubin, in U.S. Pat. No. 3,075,924 teaches a detergent composition which includes a long chain aliphatic sulfate and an alkyl amine acetic acid. The mixture serves as a chelating agent to complex with metal irons.

Clark et al, in U.S. Pat. No. 3,053,897, discloses compositions for the removal of rust and scale. As previously discussed, rust may be considered a form of scale when the iron oxide is deposited by an aqueous mixture. Clark teaches the use of triethanolamine in combination with an alkali and an aliphatic hydroxy acid. Clark also teaches the use of alkali metal salts of sulfonated fatty acids.

Conklin et al, in U.S. Pat. No. 2,847,384, discloses a descalin composition which includes a nonionic wetting agent which is a mixture of polyoxythylene-propylene polymeric compounds with sodium xyleyene sulfate.

Petroy, U.S. Pat. No. 3,699,047, employed zinc ion in a scale inhibiting composition which may also include an alkylene amine acetic acid compound.

Monson, in U.S. Pat. No. 2,589,195, discloses an inhibiting scale composition which includes a triethanolamine which is reacted with an ethylene oxide to form an amine having a number of ethylene oxide units. The terminal hydroxy groups are acylated with a fatty acid.

However, there is a continuing need for a descaling composition which can remove scale deposited from fresh or brine water from all types of surfaces and is relatively safe, easy to use, and effective.

SUMMARY OF THE INVENTION

The present invention is directed to a composition comprising: (a) an anionic fatty alcohol metal sulfate surfactant; (b) a nonionic substituted poly(ethylene oxide) surfactant; (c) an ethanol amine of the formula $$NR_{3-x}(CH_2CH_2OH)_x; \qquad \text{I}$$

wherein R is hydrogen or an alkyl group of 1–4 carbon atoms and x is an integer of from 1 to 3; (d) zinc, wherein the ratio by weight of zinc to (a)+(b) is between about 9:1 and 10:1 and wherein the ratio by weight of (a):(b):(c) is about 1:1:1; and (e) hydroxyacetic acid wherein the ratio by weight of (e) to (a)+(b)+(c) is about 1:2.

A preferred composition is one wherein the metal of (a) is an alkali metal, more preferably sodium. The preferred fatty alcohol of (a) has about 10 to 14 carbon atoms, more preferably, about 12 carbon atoms. The composition embraces a nonionic surfactant of (b) which is a compound of the formula

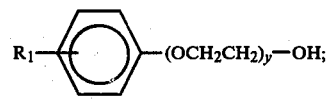

wherein $R_1$ is an alkyl group of about 8 to 10 carbon atoms and y is an integer of from about 1 to 70, preferably 9 or 10; or a compound of the formula $$R_2(OCH_2CH_2)_zOH; \qquad \text{III}$$

wherein $R_2$ is an alkyl group having about 11 to 15 carbon atoms and z is an integer of between about 3 to 40, preferably about 9 to 10. Triethanolamine is preferred as the ethanol amine (c).

A preferred composition is one comprising sodium lauryl sulfate; a compound of formula II; wherein $R_1$ is an alkyl having about 8 to 10 carbon atoms and y is 9 or 10, or a compound of formul III, wherein $R_2$ is an alkyl group having from about 11 to 15 carbon atoms and z is an integer of from about 9 to 10; an ethanol amine of formula I; wherein x is 3; zinc; and hydroxyacetic acid.

The composition may additionally include water. A preferred amount of water is about 4.5 weight to volume percent mixture of (a)+(b)+(c)+(d) to water. Particularly preferred is a composition which comprises sodium lauryl sulfate; a compound of the formula II; wherein $R_1$ is alkyl having about 8 to 10 carbon atoms and y is 9 to 10, or a compound of the formula III; wherein $R_2$ is an alkyl group having about 11 to 15 carbon atoms and z is an integer of from about 9 to 10; an ethanolamine of formula I; wherein x is 3; zinc; and hydroxyacetic acid.

Compositions of the present invention can also include a thickner, particularly xanthan gum.

Also embraced in the present invention is a method for removing scale from a surface comprising contacting the scale with a scale removing effective amount of the composition of the present invention. A preferred composition for this method is one wherein the composition includes sodium lauryl sulfate; a compound of formula II; wherein $R_1$ is alkyl having about 8 to 10 carbon atoms and y is 9 or 10, or a compound of formula III; wherein $R_2$ is an alkyl group having about 11 to 15 carbon atoms and z is an integer of from about 9 to 10; triethanolamine; zinc; and hydroxyacetic acid. More preferred for this method are compositions which contain an amount of water sufficient to produce an about 4.5 to volume percent of mixture (a)+(b)+(c)+(d) to water.

The present invention includes a descaling composition comprising a diluent and the composition of the present invention, preferably wherein the diluent is water. A preferred descaling composition is one wherein the weight to volume percent of the composition to water is about 8 to 50, more preferably about 10 to 25.

Preferably, the composition of the present invention in the descaling composition comprises sodium lauryl sulfate; a compound of formula II; wherein $R_1$ is alkyl having from 8 to 10 carbon atoms and y is 9 or 10, or a compound of formula III; wherein $R_2$ is an alkyl group having from about 11 to 15 carbon atoms and z is an integer of from about 9 to 10; (c) is an ethanolamine of formula I, wherein x is 3; zinc; and hydroxyacetic acid. The descaling composition may also include a thickener, preferably xanthan gum.

Embraced by the present invention, is a method for preparing a descaling composition comprising the steps of: (1) mixing a nonionic substituted poly(ethylene oxide) surfactant with a mixture of zinc and a fatty alcohol metal sulfate; (2) adding an ethanol amine of formula I; wherein R is hydrogen or an alkyl group of 1-4 carbon atoms; and (3) adding hydroxyacetic acid; wherein the ratio by weight of zinc to the nonionic surfactant plus the anionic surfactant is between about 9:1 and 10:1, the ratio by weight of the nonionic surfactant to the anionic surfactant to the ethanolamine is about 1:1:1, and the ratio by weight of hydroxyacetic acid to the nonionic surfactant puls the anionic surfactant plus the ethanolamine is about 1:2. The method may also include the additional step of diluting the composition with a silutent, preferably wherein the diluting step occurs after step (2) and before step (3) and, more preferably, wherein the dilutent is water. Furthermore, the method may include the step of adding a thickener.

BRIEF DESCRIPTION OF THE DRAWING

FIG. 1 is a table of effect of the concentration of a descaling composition of the present invention upon scale.

DETAILED DESCRIPTION OF THE INVENTION

Figure 2:
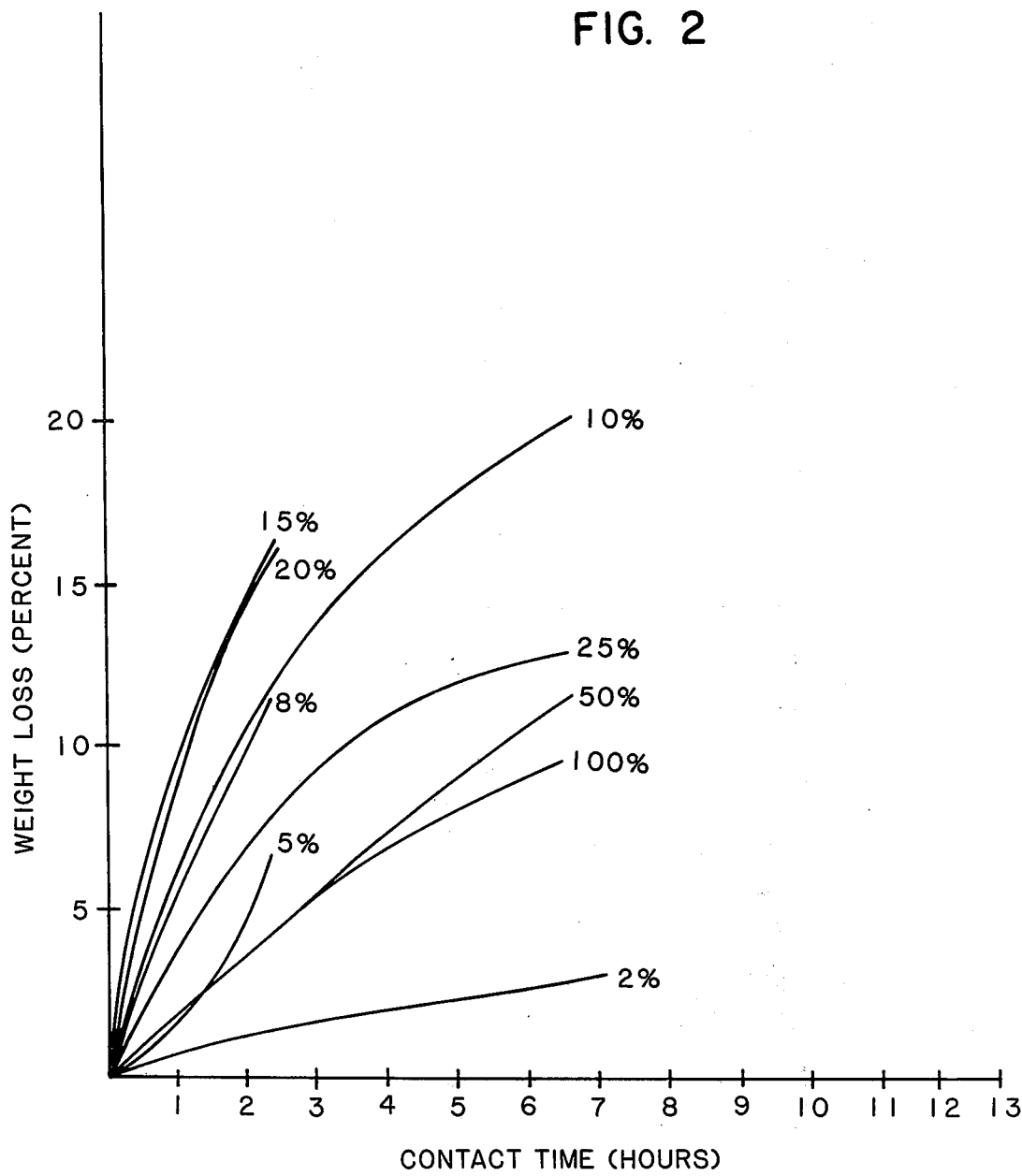
FIG. 2 is a graph of scale weight loss versus scale chip contact time for various descaling compositions of the present invention.

The ingredients of the present composition and descaling composition are well known and commercially available. The anionic surfactant is generally available as an aqueous solution. Thus, for example, sodium lauryl sulfate having a weight to volume concentration of at least about 30% is preferred.

It has been found that zinc may serve as a catalyst to accelerate the formation of a gel consisting of the anionic surfactant, the nonionic surfactant and the ethanolamine as well as the zinc. The zinc is available in many forms such as shot balls, powder and chunks. It has been found that the preferred form of zinc is in solid ball form. When the zinc is added to the aqueous anionic surfactant and the nonionic surfactant, gellation is observed to occur. Generally, the zinc is added to an aqueous solution of the two surfactants. The choice of anionic and ionic surfactants depends on their compatibility, that is, their ability to each remain in solution in the presence of the other, their ability to gel and the like.

To the gel is added an ethanolamine of formula I, preferably triethanolamine, at about 28.5 degrees centigrade. The ethanolamine serves to break up the gel forming a solution. The choice of ethanol amine will be influenced by its effect on the final pH as well as its solubilization properties. Preferably the solution is now diluted with, for example, water. A preferred solution is 4.5% weight to volume of the anionic surfactant plus the nonionic surfactant plus the ethanolamine to water.

Finally, hydroxyacetic acid is added to obtain the composition of the present invention. This step is performed at between about 20 and 28 degrees centigrade, preferably 22 degrees centigrade. The pH will, of course, depend on the choice of anionic surfactant, nonionic surfactant and ethanol amine percent surfactant composition and amount of hydroxyacetic acid. An optimal pH will depend on the nature of the scale to be removed and the surface upon which the scale is deposited. Generally, a pH of between 1.5 and 2.5 has been found to be effective for a variety of scale materials and surfaces.

The composition can also include a thickener present in the range of 0.005 to 10 weight percent. Suitable thickeners include xanthan gum, traganth or any gum or polymeric thickener which is effective in the present composition at a pH of less than about 3. The preferred thicknener is xanthan gum such as that available as Kelzan S in which the gum particles are coated with glyoxal for ease of dispersion in aqueous media.

The composition of the present invention is best employed by diluting with water. It has been found that the most effective composition is comprises between about 8 and 50% of the present composition in water by weight to volume. More preferred compositions involve 10 to 25% water. In general, compositions less than about 8% react too slowly to be effective. Furthermore, compositions above 50% generally are no more effective than those of about 50%, thereby causing inefficient use of materials. The diluted composition is generally stable and can be handled and shipped without unusual precautions. Of course, the composition and descaling composition may additionally contain ingredients such as dyes, scents and the like. As is well known in the art, these additional ingredients are employed in formulating a product for acceptance in commercial and consumer markets.

The present composition and descaling composition may be employed to remove scales. The standard scale chip material which is employed for testing the scale removing ability of a formulation consists of water-insoluble metal carbonates. However, the present invention may be used to remove both inorganic and organic scale, particularly calcium carbonate and iron oxides.

The present descaling composition may be employed on a variety of surfaces to remove scale which has built up. The surfaces include bathroom tiles, sinks, tubs, faucets, glass and plastic enclosures, fiberglass walls, bathroom and kitchen work surfaces, stainless steel surfaces, chrome surfaces, and any other nonporous surface which may be subject to scale accumulation. Of course, the present invention may also be employed to clean swimming pool tile surfaces, plastic and metal parts on swimming pool pumps, skimmers and other hardware associated with swimming pools wherein scale may be a problem. In fact, any unit, apparatus or equipment where scale is a problem, including, but not limited to, plumbing units, household bathrooms, household kitchens, industrial boilers, industrial coolers, heat exchanges, condensers, central heating systems nd humidifiers, automobile engine radiators and piping found in engines, may benefit from the use of the present invention. The present invention may be employed by adding the composition or descaling composition to the water flowing by or otherwise in contact with the surfaces to be descaled. The scale may also be removed by direct application by using brushes, sprayers, and other methods known in the art for cleaning metal and other surfaces.

The descaling compositions of the present invention were found not to be an irritant when tested in a primary dermal irritation study in rabbits according to the protocol established by the Environmental Protection Agency. No erythma, edema or other dermal adverse effects were observed.

The present invention will be further illustrated by means of the following examples. It is to be understood, however, that these examples are merely for illustrative purposes and that the present invention is not meant to be limited thereby.

EXAMPLE 1

A compound of formula II; wherein $R_1$ is alkyl of 9 carbon atoms and y is 9 to 10 (10 grams), was added to a 30% aqueous weight to volume solution of sodium lauryl sulfate (10 grams) in the presence of 0–106 grams of zinc in the form of a solid chunk at a temperature of 24.5° C. The temperature rose to 33.5° C. and a gellation occurred. Triethanolamine (10 grams) was added to the mixture which was then diluted with 63.7 milliliters of water so that the total weight of the alcohol plus sulfate plus triethanolamine comprised a 4.5% weight to volume solution. To this solution, 19.8 grams of 70% hydroxyacetic acid were added.

EXAMPLE 2

The mixture as prepared in Example 1 was diluted with water so that the weight to volume concentration ranged from 0 to 100%. Scale chips which consisted of 56% carbonate, 33% calcium, 4% potassium, 4% hydrogen from ($H_2O$), 2% silicon dioxide, and 1% others, by weight, had had been air dryed, were employed. The scale chips about 1 mm thick were placed in a 200 milliliter bath at 70° F. consisting of the mixture of the Example 1 diluted with water. At one hour increments, the weight loss of the scale chips were measured after drying the chip on a hot plate at 100° C. and cooling the chip at 25° C. The results are recorded in the table of FIG. 1.

The results in the table of FIG. 1 indicate that, in the absence of the mixture of Example 1, the scale did not lose any substantial weight after nine hours. Furthermore, the results indicate that concentrations of 10 to 25% are preferred and that no advantage is gained by employing a concentration above 50%.

EXAMPLE 3

The procedures and materials of Example 2 were employed using concentrations of the mixture of Example 1 in water ranging from 2% to 100%. The results are plotted in the graph of FIG. 2 for the percent weight loss of the scale chip versus hours in contact in the bath. As can be seen, the most effective concentration is 10%, however, concentrations in the range of 8 to 20% appear to act rapidly while those of 25% or greater or less act slower. The 2% solution was the least effective.

EXAMPLE 4

The procedures of Example 1 were employed to prepare the following formulation except that xanthan gum was added following the addition of hydroxyacetic acid:

| | |
|---|---|
| Nonionic formulation of formula II wherein $R_1$ is nonyl and y is 9–10 | 1.5 g |
| Sodium laryl sulfate | 1.5 g |
| Triethanol amine | 1.5 g |
| Zinc | g |
| 70% hydroxyacetic acid | 33.0 g |
| Xanthan gum | 0.13 g |
| Water | 62.0 g |
| Color and scent | trace |

What is claimed is:

1. A composition comprising
   (a) an anionic fatty alcohol metal sulfate surfactant;
   (b) a nonionic, substituted poly(ethylene oxide) surfactant;
   (c) an ethanol amine of the formula $MR_{3-x}(CH_2CH_2OH)_x$;

wherein R is hydrogen or an alkyl group of 1–4 carbon atoms and x is an integer of from 1 to 3;
   (d) zinc;
   (e) hydroxyacetic acid; wherein the ratio by weight of (d) to (a)+(b) is between about 9:1 and 10:1, the ratio by weight of (a):(b):(c) is about 1:1:1 and the ratio by weight of (e) to (a)+(b)+(c) is about 1:2.

2. A composition in accordance with claim 1 wherein the metal of (a) is an alkali metal.

3. A composition in accordance with claim 2 wherein the metal is sodium.

4. A composition in accordance with claim 1 wherein the fatty alcohol of (a) has about 10 to 14 carbon atoms.

5. A composition in accordance with claim 4 wherein the fatty alcohol has about 12 carbon atoms.

6. A composition in accordance with claim 1 wherein the nonionic surfactant of (b) is a compound of the formula

wherein $R_1$ is an alkyl group of about 8 to 10 carbon atoms and y is an integer of from about 1 to 70.

7. A composition in accordance with claim 6 wherein y is 9 or 10.

8. A composition in accordance with claim 1 wherein the nonionic surfactant of (b) is a compound of the formula $R_2(OCH_2CH_2)_z$—OH;

wherein $R_2$ is an alkyl group having about 11 to 15 carbon atoms and z is an integer of between about 3 and 40.

9. A composition in accordance with claim 8 wherein z is between 9 and 10.

10. A composition in accordance with claim 1 wherein x is 3.

11. A composition in accordance with claim 1 wherein (a) is sodium lauryl sulfate; (b) is a compound of the formula

wherein $R_1$ is alkyl having 8 to 10 carbon atoms and y is 9 or 10, or a compound of the formula $R_2(OCH_2CH_2)_y$—OH;

wherein $R_2$ is an alkyl group having from about 11 to 15 carbon atoms and z is an integer of from about 9 to 10; and (c) is an ehtanolamine, wherein x is 3.

12. A composition in accordance with claim 1 additionally comprising a thickener.

13. A composition in accordance with claim 12 wherein the thickener is xanthan gum.

14. A composition in accordance with claim 1 additionally comprising water.

15. A composition in accordance with claim 14 wherein the amount of water present produces an about 4.5 weight to volume percent mixture of (a)+(b)+(c)+(d) to water.

16. A composition in accordance with claim 15 wherein (a) is sodium lauryl sulfate; (b) is a compound of the formula

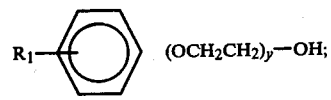

wherein $R_1$ is alkyl having 9 or 10 carbon atoms and y is 9 or 10, or a compound of the formula $R_2(OCH_2CH_2)_z$OH;

wherein $R_2$ is an alkyl group having about 11 to 15 carbon atoms and z is an integer of from about 9 to 10; and (c) is ethanolamine wherein x is 3.

17. A composition according to claim 16 additionally comprising a thickener.

18. A composition in accordance with claim 17 wherein the thickener is xanthan gum.

19. A method for removing scale from a surface comprising contacting the it a scale removing effective amount of the composition of claim 1.

20. A method in accordance which claim 19 wherein (a) is sodium lauryl sulfate; (b) is a compound of the formula

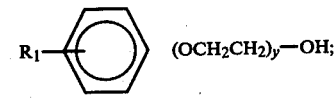

wherein $R_1$ is alkyl having 8 to 10 carbon atoms and y is 9 or 10, or a compound of the formula $R_2(OCH_2CH_2)_z$OH;

wherein $R_2$ is an alkyl group having from about 11 to 15 carbon atoms and z is an integer of from about 9 to 10; and (c) is an ethanolamine wherein x is 3.

21. A method in accordance with claim 20 wherein the composition additionally comprises an amount of water present so as to produce an about 4.5 weight to volume percent mixture of (a)+(b)+(c)+(d) to water.

22. A descaling composition comprising a dilutent and the composition of claim 1.

23. A descaling composition in accordance with claim 22 wherein the dilutent is water.

24. A descaling composition in accordance with claim 23 wherein the weight-to-volume percent of the composition of claim 1 to water is about 8 to 50.

25. A descaling composition in accordance with claim 24 wherein the percent is 10 to 25.

26. A descaling composition in accordance with claim 25 wherein (a) is sodium lauryl sulfate; (b) is a compound of the formula

wherein $R_1$ is alkyl having 8 to 10 carbon atoms and y is 9 or 10, or a compound of the formula $R_2(OCH_2CH_2)_z$OH;

wherein $R_2$ is an alkyl group having from about 11 to 15 carbon atoms and z is an integer of from about 9 to 10; and (c) is an ethanolamine wherein x is 3.

27. A descaling composition in accordance with claim 26 additionally comprising a thickener.

28. A descaling composition in accordance with claim 27 wherein th thickener is xanthan gum.

29. A method for perparing a descaling composition comprising the steps of:
(a) mixing a nonionic, substituted-polyethylene oxide surfactant with a mixture of zinc and an anionic fatty alcohol metal sulfate surfactant;
(b) adding an ethanolamine of the formula $NR_{3-x}(CH_2CH_2OH)_x$;

wherein R is hydrogen or an alkyl group of 1–4 carbon atoms and x is an integer of 1–3; and
(c) adding hydroyacetic acid;
wherein the ratio by weight of zinc to the nonionic surfactant plus the anionic surfactant is between about 9:1 and 10:1, the ratio by weight of the nonionic surfactant to the ethanolamine is about 1:1:1, and the ratio by weight of hydroxyacetic acid to the nonionic surfactant plus the anionic surfactant plus the ethanol amine is about 1:2.

30. A method in accordance with claim 29 comprising the additional step of (d) diluting the composition with a dilutent.

31. A method in accordance with claim 30 wherein step (d) is performed after step (b) and before step (c).

32. A method in accordance with claim 30 wherein the diluent is water.

33. A method in accordance with claim 30 comprising the additional step of adding a thickener.

* * * * *